United States Patent
Matsumura et al.

(10) Patent No.: US 7,160,453 B1
(45) Date of Patent: Jan. 9, 2007

(54) FILTER FOR REMOVING CONTAMINANTS FROM WATER

(75) Inventors: Toshio Matsumura, Tokyo (JP); Tsuyoshi Urabe, Kobe (JP); Shin-Ichi Sakata, Kobe (JP)

(73) Assignee: Mitsuboshi Belting Ltd., Kobe (JP)

(*) Notice: Subject to any disclaimer, the term of this patent is extended or adjusted under 35 U.S.C. 154(b) by 0 days.

(21) Appl. No.: 09/594,324

(22) Filed: Jun. 15, 2000

(51) Int. Cl.
    *B01D 27/14* (2006.01)
(52) U.S. Cl. .............. 210/315; 210/489; 210/497.01; 210/502.1; 210/504
(58) Field of Classification Search .......... 210/266, 210/282, 315, 497.01, 503, 510.1, 502.1, 210/489, 504, 506
See application file for complete search history.

(56) References Cited

U.S. PATENT DOCUMENTS

| | | | |
|---|---|---|---|
| 4,636,307 A | * 1/1987 | Inoue et al. | 210/266 |
| 4,753,728 A | 6/1988 | VanderBilt et al. | 210/282 |
| 5,019,252 A | * 5/1991 | Kamei et al. | 210/266 |
| 5,160,038 A | * 11/1992 | Harada et al. | 210/266 |
| 5,882,517 A | * 3/1999 | Chen et al. | 210/510.1 |
| 5,904,854 A | * 5/1999 | Shmidt et al. | 210/694 |

FOREIGN PATENT DOCUMENTS

| | | |
|---|---|---|
| EP | 0345381 | 12/1989 |
| JP | A-71541/1996 | 3/1996 |
| JP | A-85729/1998 | 4/1998 |

* cited by examiner

*Primary Examiner*—Ivars C. Cintins
(74) *Attorney, Agent, or Firm*—Wood, Phillips, Katz, Clark & Mortimer (57) ABSTRACT

A filter for removing contaminants from water. The filter has a first porous filter part formed by setting an active carbon in a high-molecular low-melt index polymeric binder. An inlet directs water to be filtered to the first porous filter part. An outlet directs water filtered by passage through the first porous filter part to a point of use.

20 Claims, 5 Drawing Sheets

FILTER FOR REMOVING CONTAMINANTS FROM WATER

BACKGROUND OF THE INVENTION

1. Field of the Invention

This invention relates to filters of the type used to treat water to remove contaminants therefrom. The invention is also directed to a method of forming a part of the filter made from active carbon.

2. Background Art

Heretofore, filter cartridges for use in household water treatment apparatus, commonly referred to as water-treating units, or water-purifying units, have generally been constructed so that chlorine and organic matter are adsorbed by a particulate active carbon, whereas pollutants, rust, and bacteria of microscopic size are picked up by a hollow yarn membrane.

One exemplary filter cartridge has a cylindrical shape, with the interior of the cartridge partitioned into an active carbon-filled chamber and a hollow yarn membrane chamber. Water directed to the cartridge is first introduced to the active carbon chamber, which removes kalk- and mold-induced malodors from the water. The water is then delivered to the hollow yarn membrane chamber where other matter that is not removed by the active carbon is picked up by the hollow yarn membrane. An example of this type of filter is disclosed in Japanese Unexamined Patent Application Publication No. 10-85729.

An alternative construction, as disclosed in Japanese Unexamined Patent Application Publication No. 8-71541, has a cartridge filter with a tube formed from a hollow yarn membrane in the center thereof with an active carbon layer disposed over an outer peripheral surface thereof. Water to be filtered flows through the active carbon layer and then through the hollow yarn member, after which treated water flows out of the cartridge.

In each of the above filters, an active carbon is used in particulate form in a chamber partitioned with a membrane. This membrane has small diameter pores sized to pass water, but not the active carbon.

With both of the above filters, chlorine is removed mainly by the active carbon, with fine pollutant and turbidity removed by the hollow yarn membrane. Since little of the fine pollutant is removed as it is passed through the active carbon, the hollow yarn is prone to becoming clogged, which potentially leads to a shortened service life.

Another problem is that the hollow yarn membrane is relatively costly and takes up a large volume of the filter. If this type of filter is used in a water treatment system, such as one where it is directly attached to faucets, size and weight reduction become significant. Accordingly, the amount of active carbon that can be utilized may be limited by the required size of the hollow yarn membrane. Limiting the amount of active carbon may result in a shortened service life for the filter in removing chlorine, and the like.

Further, in a filter where a particulate active carbon is used, a water channel may be formed in the active layer as water is continuously directed therethrough. Once this channel is formed, the flowing water may be diverted through the channel, as a result of which the active carbon is only partially used during the filtering process. As a result, the filter may have a shortened life in terms of its ability to remove chlorine, and the like.

In Japanese Unexamined Patent Application Publication No. 2-17989, a water treatment filter is disclosed which has active carbon particles embedded in a porous, plastic matrix. This filter is designed so that the particulate active carbon can be used with a small particle diameter dispersed in the porous plastic matrix.

In U.S. Pat. No. 4,753,728, another filter is disclosed in which active carbon is set in a polymer. The polymer has a low melt index of less than 1.0 g/10 min (ASTM D13238, 190° C., 15 kg Load).

These last two filters are highly efficient since active carbon particles of small particle diameter can be used. The water flowing into the filter can flow through the entirety thereof, offering potentially a good service life in removing chlorine, and the like, with the active carbon.

However, these filters are deficient in that they are generally not capable of sufficiently removing fine pollutant from water and of adequately treating water that is highly turbid.

Further, the patent documents describing these last two filters do not disclose that these filters can be used on faucet-joined water-treating apparatus. The filters used on faucet-joined water-treating apparatus are preferably light in weight and small in size. Generally, with a filter having an active carbon dispersed in plastic, downsizing results in an inability to adequately remove chlorine, and the like. In the case of a filter for faucet-joined water-treating apparatus, a flow rate of water is desired to be around 2.0 to 3.0 L/min. By improving the ability to remove chlorine and the like, small diameter particulate active carbon has been found to impede the flow rate so that it is less than that desired.

SUMMARY OF THE INVENTION

In one form, the invention is directed to a filter for removing contaminants from water. The filter has a first porous filter part formed by setting an active carbon in a high-molecular low-melt index polymeric binder. An inlet directs water to be filtered to the first porous filter part. An outlet directs water filtered by passage through the first porous filter part to a point of use.

The polymeric binder may be a porous polymer with a melt index from 1.1 to 2.3 g/10 min (ASTM D1238, 190° C., 15 kg Load).

In one form, the filter includes a second fibrous filter part having a hollow yarn membrane, with the inlet and outlet arranged so that water to be treated passes from the inlet first through one of the first porous filter part and the second fibrous filter part, then through the other of the first porous filter part and the second fibrous filter part, and then to and through the outlet.

In one form, the one of the first porous filter part and second fibrous filter part is the first porous filter part.

In one form, the first porous filter part has a peripheral surface through which untreated water passes in moving from the inlet towards the outlet.

The filter may further include a peripheral filtering layer around the first porous filter part through which water to be filtered is passed in moving toward the first porous filter part.

The filter may further include water-impermeable first and second caps attached in watertight relationship to the first porous filter part, with one of the caps having an opening for discharging water treated by the first porous filter part.

In one form, the first porous filter part is located externally of the first fibrous filter part and the inlet and outlet are arranged so that water to be treated passes from the inlet from externally of the first porous filter part, to and through the first fibrous filter part, to and through the second fibrous filter part.

The filter may further include a peripheral filtering layer around the first porous filter part and water-impermeable first and second caps attached in watertight relationship to the first porous filter part, with one of the caps having an opening for discharging water treated by the first porous filter part.

A second filter part may be situated so that the first porous filter part and second filter part are located one on top of the other.

The first porous filter part may be above the second filter part, with the inlet and outlet arranged so that water to be treated passes from the inlet to the first porous filter part, through the first porous filter part to the second filter part, and through the second filter part to the outlet.

In one form, the active carbon consists of a first particulate active carbon capable of passing through a mesh of 60 to 100 and a second particulate active carbon capable of passing through a mesh of 100, with the first and second particulate active carbon being mixed in a ratio of 1:1–4:1.

In one form, the first porous filter part has a polymeric binder present in an amount of 10–25% by weight to active carbon, with the first porous filter part having a density of 0.5–0.65 g/cm$^3$.

In one form, the peripheral filtering layer is at least one of a fibrous material, a non-woven fabric, and a woven fabric.

The hollow yarn membrane may have pores of a size on the order of 0.01 to 5 μm.

In one form, the hollow yarn membrane is at least one of polyvinyl alcohol, polyacrylonitrile, polyvinyl chloride, polyethylene, polypropylene,4-methyl-1-pentene, polyester, polyamide, polysulfone, and cellulose derivatives.

The filter may further include an adaptor for connecting the filter to a conventional tap water faucet.

The outlet may be defined by a through hole.

The first porous filter part may have a cylindrical shape.

The peripheral filtering layer may have a cylindrical shape.

In one form, the first porous filter part is made by a method including the steps of mixing together a) a powdery or particulate active carbon and b) a high-molecular low-melt index polymeric binder in a predetermined ratio to make a first mixture, placing the first mixture in a mold having a height, vibrating the first mixture so that it has a height in the mold that is 5–15% greater than the desired height for the first porous filter part upon completion thereof, heating the mixture to fluidize the polymeric binder, pressing the first mixture in the mold to adjust the height of the first mixture in the mold, cooling the first mixture in the mold to complete formation of the first porous filter part, and separating the first porous filter part from the mold.

The invention is further directed to a method of forming a filter part for removing contaminants from water, which method includes the steps of mixing together a) a powdery or particulate active carbon and b) a high-molecular low-melt index polymeric binder in a predetermined ratio to make a first mixture, placing the first mixture in a mold having a height, vibrating the first mixture so that it has a height in the mold that is 5–15% greater than a desired height for the filter part upon completion thereof, heating the mixture to fluidize the polymeric binder, pressing the mixture in the mold to adjust the height of the mixture in the mold, cooling the mixture in the mold to complete formation of the filter part, and separating the filter part from the mold.

In one form, the filter part has a weight, and the pressing step involves pressing the mixture with a force equal to up to 10 times the weight of the filter part. This force may be varied during the pressing step.

In one form, the polymeric binder is a porous polymer having a melt index of 1.1 to 2.3 g/10 min (ASTM D1238, 190° C., 15 kg Load).

The active carbon may include a first particulate active carbon capable of passing through a mesh of 60–100 and a second particulate active carbon capable of passing through a mesh of 100, with the first and second particulate active carbon being mixed in a ratio 1:1 to 4:1.

The polymeric binder may be present in an amount of 10–25% by weight to the active carbon, with the filter part having a density after cooling of 0.5 to 0.65 g/cm$^3$.

DETAILED DESCRIPTION OF THE DRAWINGS

Figure 1:
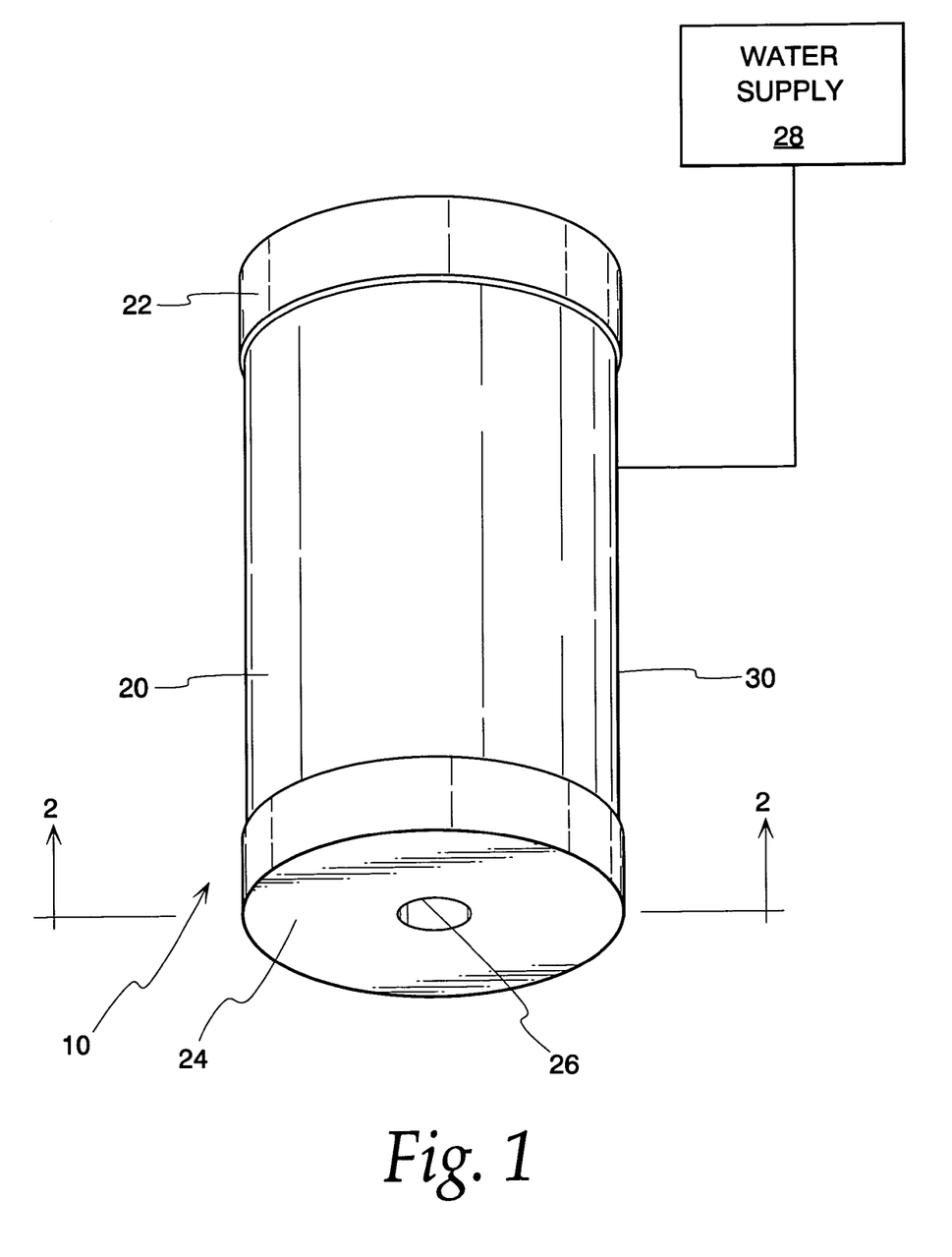
FIG. 1 is a perspective view of a filter made according to the present invention.
Figure 2:
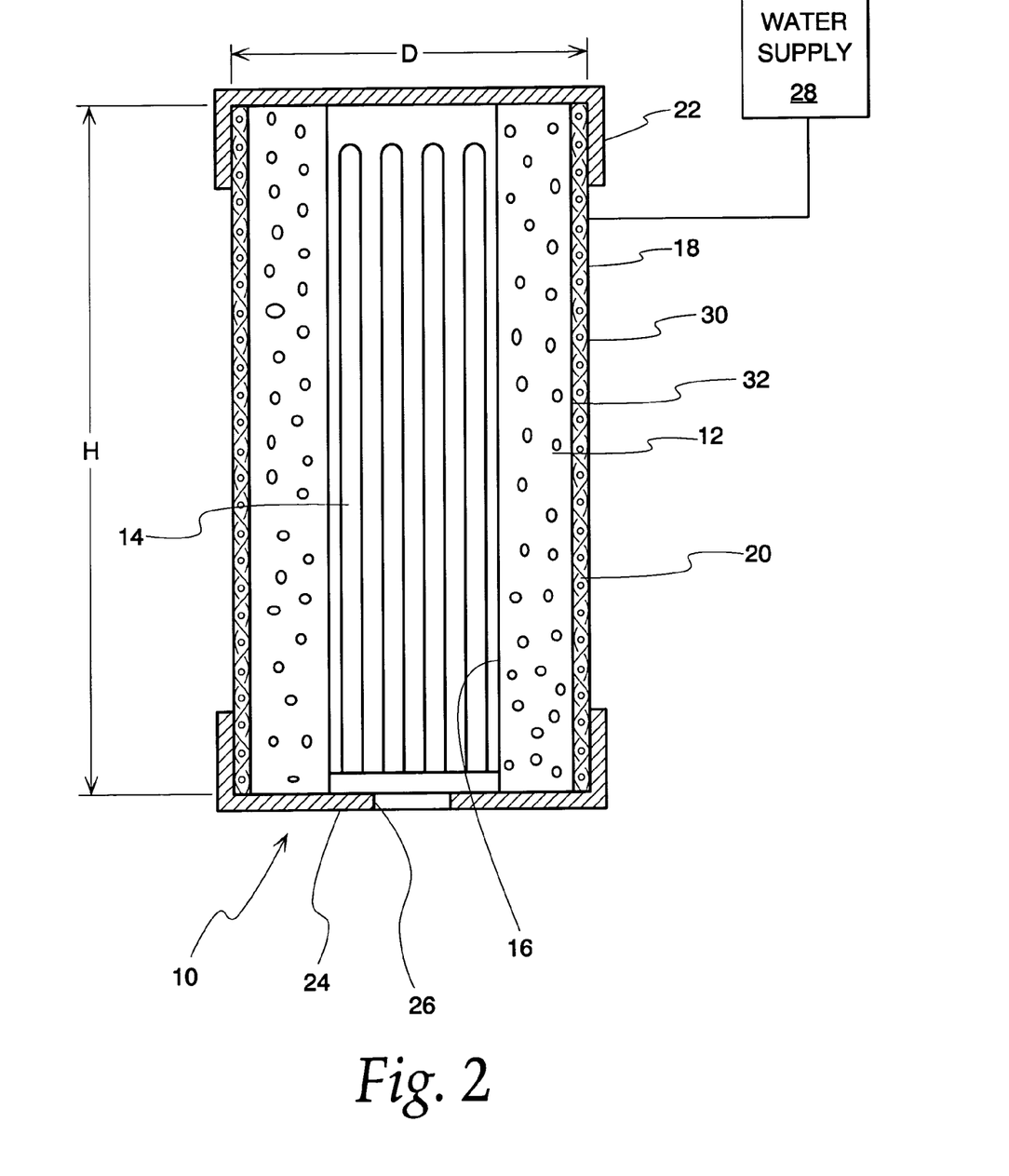
FIG. 2 is a cross-sectional view of the filter taken along line 2—2 of FIG. 1.

In FIGS. 1 and 2, one form of filter, according to the present invention, is shown at 10. The filter 10 has an overall cylindrical shape with an exemplary diameter D, on the order of 45–50 mm, and a height H on the order of 90–100 mm. The filter 10 consists of a first porous filter part 12, formed by setting an active carbon in a high-molecular low-melt index polymeric binder, and a second fibrous filter part 14. The first porous filter part 12 has a tubular shape with an inside, cylindrical opening 16. The second fibrous filter part 14 has a cylindrical shape which fits closely within the inside opening 16.

The first porous filter part 12 has an outer surface 18 against which a peripheral filtering layer 20 is attached. The filter 10 further includes a top cap 22 and a bottom cap 24. The caps 22, 24 each surround the first porous filter part 12 and are integrally attached thereto, by fusion or adhesion to make a watertight connection between the caps 22, 24 and the first porous filter part 12. The bottom cap 24 has a through opening 26 which defines an outlet. The watertight connection between the caps 22 24 and first porous filter part 12 prevents untreated water from finding its way to the through opening 26 by migration between the caps 22, 24 and the adjacent ends of the first porous filter part 12. The inside opening 16 has an exemplary diameter on the order of 10–25 mm.

Water from a supply 28 flows against the exposed surface 30 of the peripheral filtering layer 20, and to the peripheral surface 32 of the first porous filter part 12, which acts as a filter inlet. The peripheral filtering layer 20 picks up coarse pollutant as the water passes therethrough which might otherwise prematurely clog the first filter part 12. Water passing through the peripheral filtering layer 20 then passes through the first porous filter part 12 during which residual chlorine, organic matter, and fine pollutant are removed by adsorption. The water then flows from the inside surface 34 of the first porous filter part 12, which functions as an outlet for the first porous filter part 12, into the opening 16 and passes through the second fibrous filter part 14 which removes much finer pollutant. The filtered water is then discharged through the through opening/outlet 26.

The cylindrical shape of the filter parts 12, 14, and filtering layer 20 affords a large surface area for high volume filtering capability.

Figure 4:
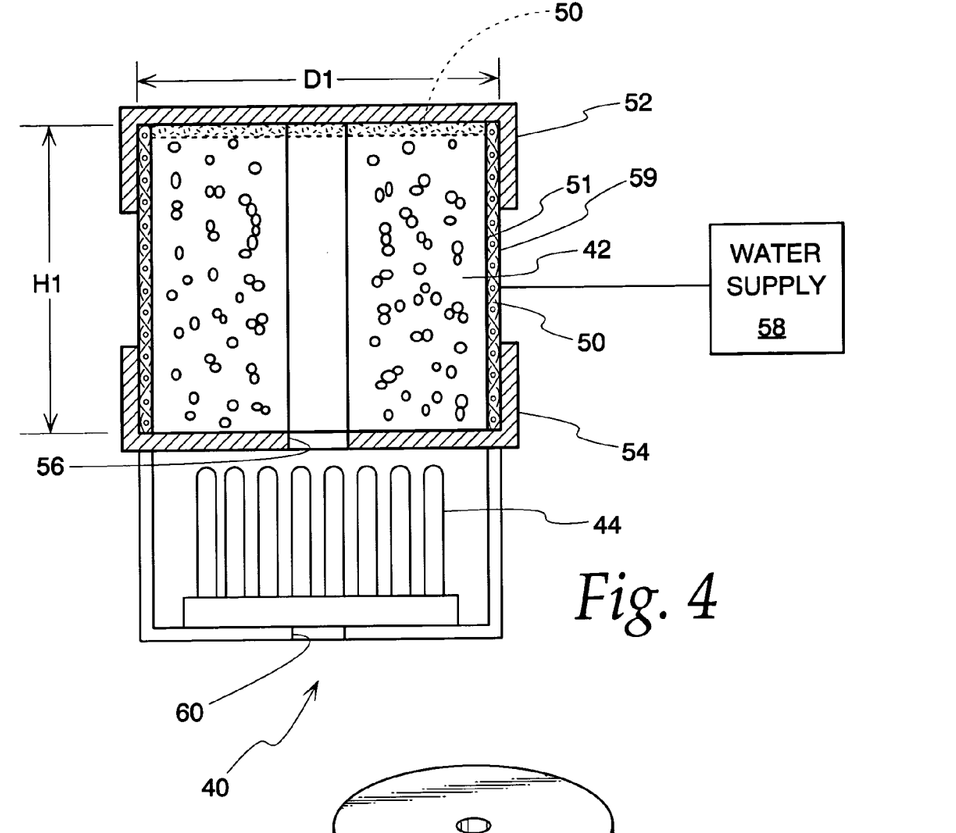
FIG. 4 is a cross-sectional view of a further modified form of filter, according to the present invention.

A modified form of filter, according to the present invention, is shown at 40 in FIG. 4. The filter 40 consists of a cylindrical first porous filter part 42, which is formed by setting an active carbon in a polymeric binder. The first porous filter part 42 has an exemplary diameter D1 on the order of 45–50 mm and a height H1 on the order of 45–50 mm. A second fibrous filter part 44 is situated at the bottom of the first porous filter part 42.

A peripheral filtering layer 50 is formed against the outer surface 51 of the first porous filter part 42. Top and bottom caps 52, 54, respectively, are disposed at the top and bottom of the first porous filter part 42. The first porous filter part 42 and top and bottom caps 52, 54 are integrally attached in watertight relation to each other, as described for the filter 10. The bottom cap 54 has a through opening/outlet 56 through which water filtered by the first porous filter part 42 is delivered to the second fibrous filter part 44.

The second fibrous filter part 44 is made from a hollow yarn membrane that is integrally connected in watertight relationship to the cap 54 and first porous filter part 42. Thus, water passing through the first porous filter part 42 flows into the second fibrous filter part 44.

Water from a supply 58 is introduced at the outer surface 59 of the peripheral filtering layer 50, and flows therethrough to the outer surface 51 of the first porous filter part 42, which surface 51 functions as the inlet to the first porous filter part 42. Water passing through the peripheral filtering layer 50 passes in turn through the first porous filter part 42 and the second fibrous filter part 44 therebeneath. The water flowing into the second fibrous filter part 44 enters at the upper end thereof and flows out a through opening/outlet 60 formed at the bottom of the second fibrous filter part 44. Consequently, the entire second fibrous filter part 44 is utilized in the filtering process to enhance water treatment capability of the filter 40. The vertical water flow permits efficient use of the entire filter, to thereby contribute to high volume treatment capability.

Optionally, as shown in phantom lines in FIG. 4, the peripheral filtering layer 50 may be disposed over the top of the first porous filter part 42 so that the top of the first porous filter part 42 serves as the inlet to the first porous filter part 42. With this arrangement, the entirety of the first porous filter part 42 can be utilized in the filtering process. This may improve the efficiency of the filter, contributing to its water treatment capability.

Figure 3:
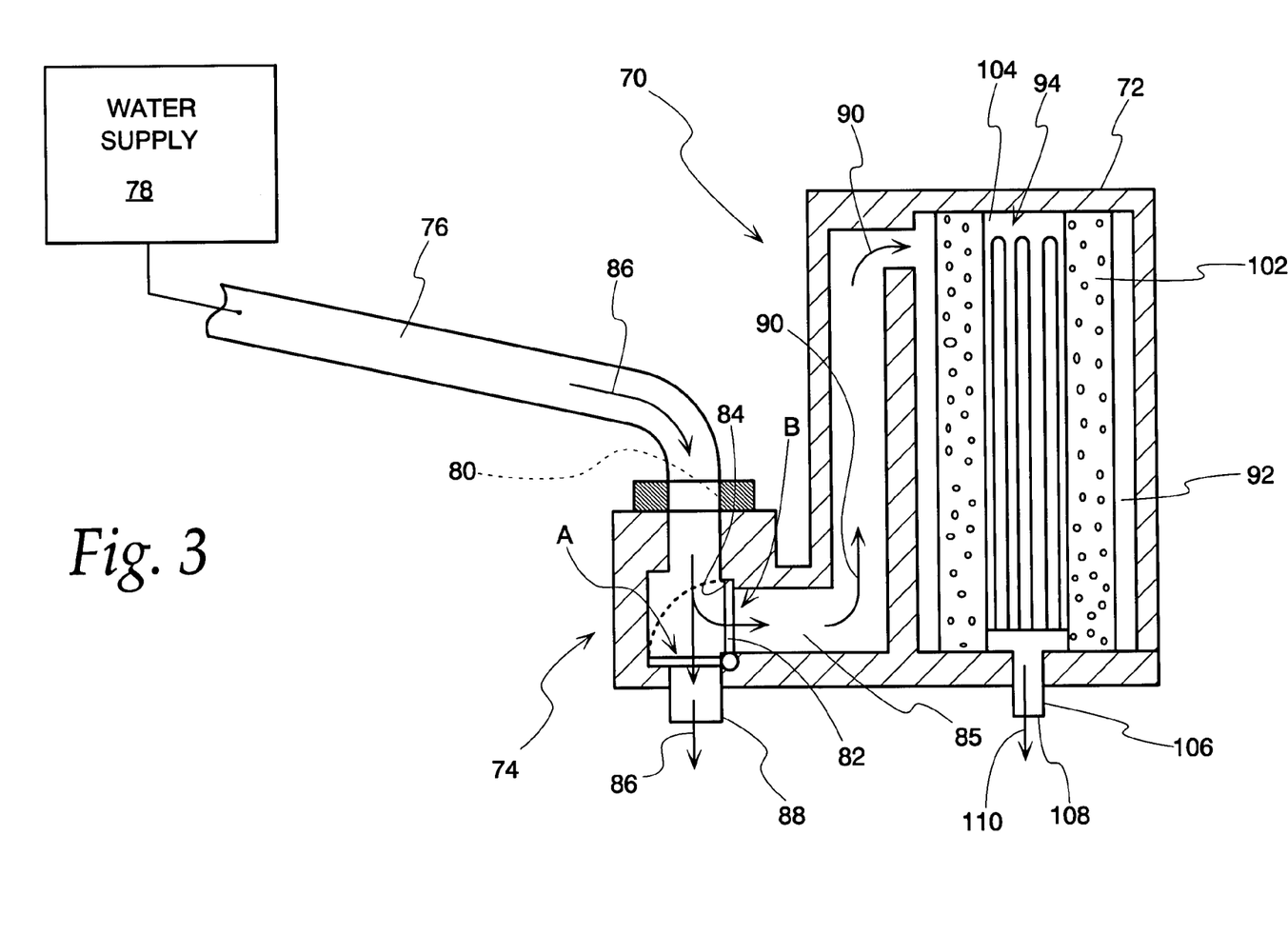
FIG. 3 is a cross-sectional view of a modified form of filter, according to the present invention, and having an adaptor for connection to a conventional top water faucet.

The filters 10, 40, can be used as interchangeable filter cartridges in a water treatment filter system, as shown at 70 in FIG. 3. Alternatively, the first filter part 42, with the peripheral filtering layer 50 and caps 52, 54 joined as in FIG. 4, can be used without the second filter part 44. The water treatment filter system 70 includes a housing 72 with an adaptor 74 for connection of the housing 72 to a spout 76 on a faucet. The spout 76 directs incoming water from a supply 78 to an outlet 80 at the free end of the spout 76.

The adaptor 74 on the housing 72 has a flapper 82 which is repositionable by pivoting between positions identified as A and B in FIG. 3. In the B position, the flapper 82 blocks an entry opening 84 to a filter entry passageway 85 so that water from the supply 78 flows in the directions of the arrows 86 to and through an outlet 88 on the adaptor 74 in an unfiltered state.

Repositioning of the flapper to the A position blocks passage of incoming water through the outlet 88 and diverts the water into the passageway 85 within which the water is caused to flow in the direction of the arrows 90 into an annular chamber 92 which surrounds a filter 94. The filter 94 consists of a first porous filter part 102 which surrounds a second fibrous filter part 104 and may have the dimensions of the filter 10, previously described. The first porous filter part 102 and second fibrous filter part 104 correspond in structure and function to the first porous filter parts 12, 42 and second fibrous filter parts 14, 44, previously described. A fitting 106 projects through the housing 72 and defines an outlet 108 for filtered water discharged from the filter 94 in the direction of the arrow 110.

The active carbon used in the first porous filter parts 12, 42 is preferably in powder or particulate form of a size that will pass through a mesh of 60 or above. Active carbon capable of passing through a mesh of less than 60 may be difficult to set in the polymeric binder. Further, if the active carbon particles are larger, there may be significant voids in the filter parts 12, 42, 102, which allow the water to flow through the filter parts 12, 42, 102 without filtering contact with the active carbon. This may result in poor performance in terms of removal of chlorine and pollutants.

More preferably, the active carbon used in the first porous filter parts 12, 42, 102 consists of two different active carbons, one having a larger particle diameter, with the other having a smaller particle diameter. The particles of the first active carbon are capable of passing through a mesh of 60 to 100, meaning they are capable of passing through a mesh of 60 but not capable of passing through a mesh of larger than 100. The particles of the second active carbon are capable of passing through a mesh of larger than 100. The active carbons are preferably mixed with a ratio of large particle active carbon to small particle active carbon between 1:1 and 4:1. The mixed active carbon is then set in a low-melt index polymeric binder.

With the mixed active carbon, the active carbon particles passing through the mesh of larger than 100 are located in the spaces defined between the active carbon particles passed through a mesh of 60–100. The first porous filter parts 12, 42, 102 are thus capable of removing chlorine and the like and are also conducive to the passage of a high flow rate of water over an extended period of time.

In the event that the smaller particles of active carbon are capable of passing through a mesh of less than 60, it is difficult to set the same in the polymeric binder. Significant voids may be created in the filter parts 12, 42, 102 so that a significant volume of water may flow through the filter parts 12, 42, 102 without filtering contact with the active carbon. This may result in poor performance in terms of removal of chlorine, and the like.

If the larger particles in the active carbon are capable of passing through a mesh of larger than 100, as for example 300, the filter parts 12, 42, 102 may be too dense so that flow of the water is impeded and desired flow volume may not be achievable.

The low-melt index polymer used as the polymeric binder is preferably non-toxic so that it may be safely used to filter water in a domestic environment for consumption. The polymer is preferably one that can be easily molded to produce a porous body. One suitable example is an ultra-high-molecular polyethylene with a molecular weight of from several hundred thousand to several million, a particle diameter of about 100 µm, a bulk density of less than 0.3 g/cm$^3$ and a melt index of 1.1 to 2.3 g/10 min (ASTM D1238, 190° C., 15 kg Load).

In the event that the melt index of the polymeric binder is less than 1.1 g/10 min (ASTM D1238, 190° C., 15 kg Load), the polymer may not be adequately fluid during filter formation. Significantly greater amounts of the polymer may be needed to effect setting of the active carbon. As a result, the useable amount of active carbon may be reduced, which compromises the capability of the filter to treat water.

In the event that the melt index of the polymeric binder is more than 2.3 g/10 min. (ASTM D1238, 190° C., 15 kg Load), the polymer may melt to cover fine pores of a particulate active carbon during filter formation, which impedes water flow through the active carbon.

With the melt index chosen as specified in the preferred form, above, the polymer for use as the binder is adequately viscous so that the fine pores of the active carbon remain exposed while an active carbon block is formed. The polymer is formed into a porous body which serves as an effective binder without significantly impairing the filtering properties of the active carbon block.

The ratio of active carbon to polymeric binder is chosen so that the polymeric binder is added in an amount of 10–25% by weight based on the weight of the active carbon, with the first filter parts 12, 42, 102 having a density of 0.5 to 0.65 g/cm$^3$. Flow rates of water greater than 2.0 L/min can be ensured at a dynamic water pressure of 0.1 MPa usually needed for faucet-joined water-treating system.

If the amount of polymeric binder is less than 10% by weight relative to the active carbon, it may be difficult to set the carbon. More than 25% by weight may cause the polymeric binder to excessively cover the surface of the active carbon, which detracts from the efficient use of the active carbon.

At less than 0.5 g/cm$^3$ density, the filter parts 12, 42, 102 may be less rigid than desired so that the filters are undesirably brittle. At more than 0.65 g/cm$^3$, the filter parts 12, 42, 102 may be harder than desired with less voids, as a consequence of which sufficient flow rates of water may not be obtainable.

The first filter parts 12, 42, 102 may be formed with additives in addition to the active carbon, which additives are capable of removing pollutant and chlorine from water.

While the first filter parts 12, 42, 102 can be used by themselves to effect filtering, they are more preferably used in conjunction with the second fibrous filter parts 14, 44, 104. The second filter parts 14, 44, 104, as previously noted, are hollow yarn membranes with a tubular shape having pores on the order of about 0.01 to 5 µm. The yarn may be made from at least one of polyvinyl alcohol, polyacrylonitrile, polyvinyl chloride, polyethylene, polypropylene, 4-methyl-1-pentene, polyester, polyamide, polysulfone, cellulose derivatives, and the like. The hollow yarn membrane is usually used with a bundle of U-shaped hollow yarns fixedly placed in a cylindrical container. Hollow yarn membranes commonly used have voids which constitute on the order of 20–90% of the overall volume.

Figure 5:
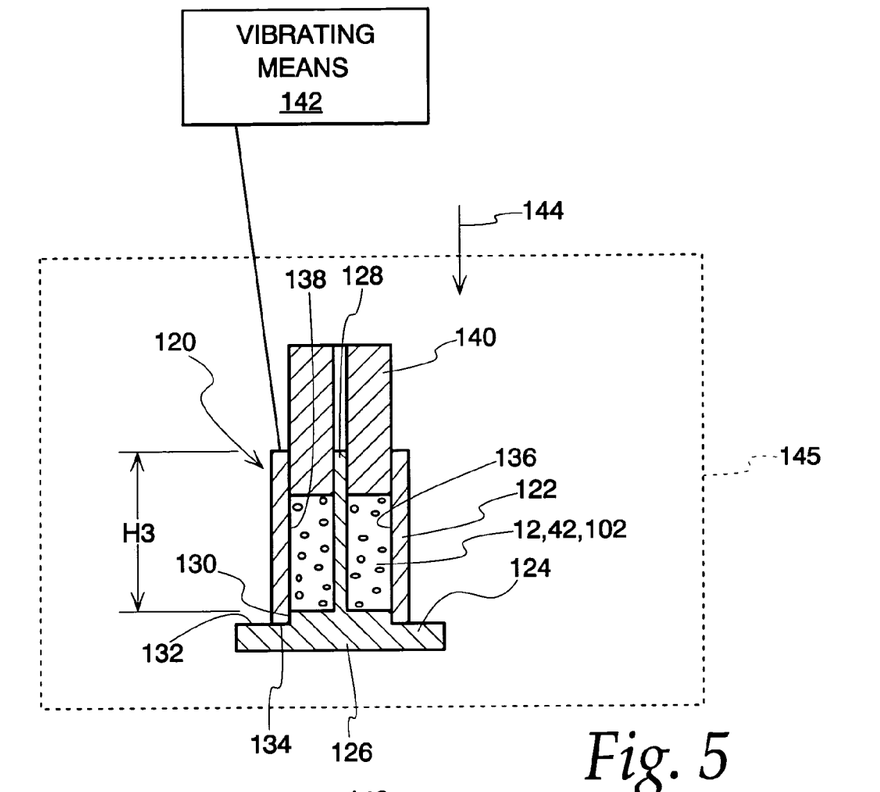
FIG. 5 is a schematic representation of a mold system for making a part of the filters in FIGS. 1–4 and with a mixture being pressed into a mold.
Figure 6:
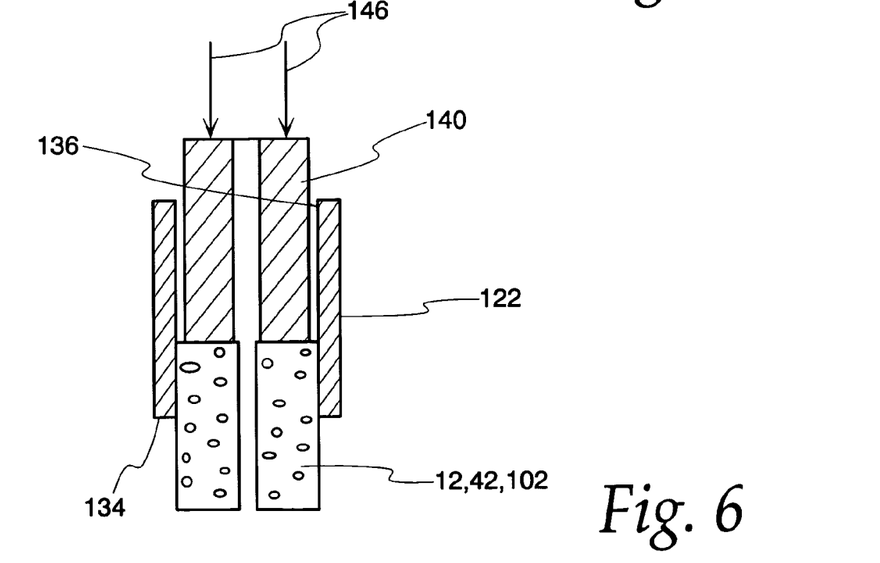
FIG. 6 is a view as in FIG. 5 showing the completed filter part being ejected from the mold.
Figure 7:
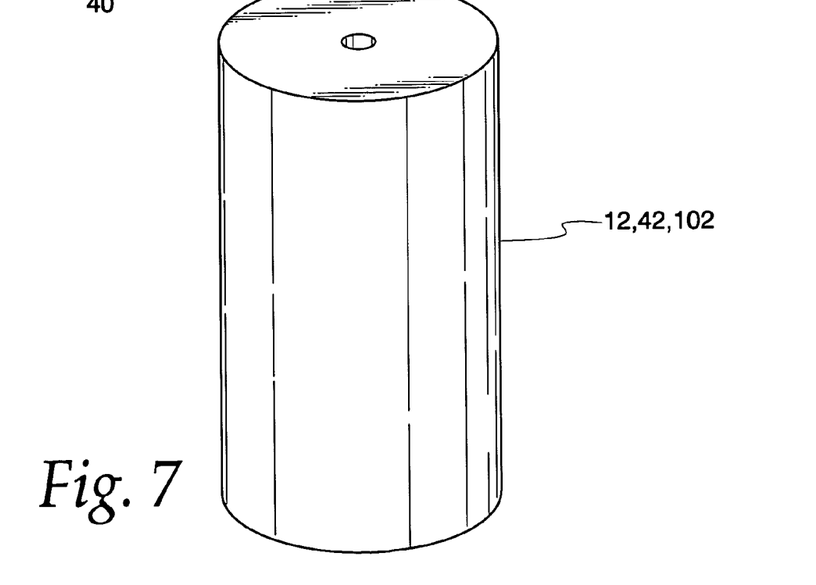
FIG. 7 is a perspective view of a filter part made according to the process shown in FIGS. 5 and 6.

The first porous filter parts 12, 42, 102, as shown in FIG. 7, are preferably made by a process, as described below with reference to FIGS. 5 and 6. The process is carried out using a mold 120 consisting of first and second cooperating mold elements 122, 124, respectively. The first mold element 122 may be made from aluminum, iron, or the like, having a high thermal conductivity. The first mold element 122 has a cylindrical shape with a hollow center. The second mold element 124 consists of a cap portion 126 and a partition 128 integrally formed therewith. The second mold element 124 is extendable into the first mold element 122 so that a reduced diameter portion 130 of the cap portion 126 nests in the first mold element and an annular shoulder 132 abuts to the end 134 of the first mold element 122. With the second mold element 124 so situated, the partition 128 and inside surface 136 of the first mold element 122 cooperatively bound an annular mold chamber 138 having a height H3.

A plunger element 140 is used in conjunction with the mold 120 and has a shape that is complementary to the annular mold chamber 138 so that the plunger element 140 can be guided slidingly in a vertical direction into the annular mold chamber 138.

An exemplary process will now be described to produce the filter part 12, 42, 102, having an exemplary inner diameter on the order of 10–11 mm, an outer diameter on the order of 35–50 mm, and a height on the order of 90–95 mm, with a selected density and a constant particle size.

An active carbon and a polymeric binder are mixed at a pre-selected ratio to produce a homogeneous dispersion of the two components. Active carbon, in particulate or powder form, with particles capable of passing through a mesh of larger than 60, is used. Active carbon with a particle diameter on the order of 10 µm is used so that the active carbon is dispersed uniformly throughout the filter part 12, 42, 102, to provide adequate water treatment.

The mixture of active carbon and polymeric binder is introduced to the mold chamber 138 until the material reaches a height equal to 150 to 200% of the desired height of the finished filter part 12, 42, 102.

The mold 120 is then vibrated through a means 142 for 5–10 seconds at an amplitude of 1–3 and at a frequency of 5–10/second until the mixture increases to a height that exceeds a desired end height of the filter part 12, 42, 102 by 5–15%. This calculation takes into account dimensional differences arising from shrinkage of the filter part after cooling.

If the vibrational amplitude and/or frequency are too high, the mixture tends to compact to a density that is greater than desired. Further, differences in particle diameter and weight may result in separation of the mixed material so that a uniform filter product may not be obtained.

On the other hand, insufficient vibration may require frequent pressure adjustments pressure to arrive at the desired height of the filter. This may lead to a difference in density in the filter at its upper and lower portions that results from pressure loss and also to clogging that arises from rubbing between an internal surface of the mold and the abutting face of the filter material. The resulting filter part 12, 42, 102 may not function as effectively as desired.

At the completion of the vibration step, the plunger element 140 is directed downwardly in the direction of the arrow 144 into the mold chamber 138. This step is followed by heating of the material at 180° C. to 260° C. for about 30–90 minutes so that the polymeric binder is fluidized. The mold is preferably placed in an oven 145 to carry this step out. Once the polymeric binder becomes fluid, the mold 120 is taken out of the oven and the plunger element 140 moved further downwardly into the mold chamber 138 to cause the mixture to approach the desired height of the desired end filter part 12, 42, 102.

The mold 120 is then cooled where after the mold elements 122, 124 are separated from each other and by pushing out the filter using the plunger 140 which is advanced in the direction of the arrows 146, as shown in FIG. 6.

The resulting filter part 12, 42, 102 has a constant particle diameter and a density of 0.5 to 0.65 g/cm³.

The pressing step using the plunger element 140 is carried out after removing the mold 120 from the oven 145. However, the pressing step may be carried out with the mold 120 in the oven 145. Heating may be performed with a lesser pressing force with the polymeric binder maintained in a fluidized state. In the event that the force applied exceeds ten times the weight of the filter part 12, 142, 102, the volume of the filter part 12, 42, 102 may become excessively small, with the result that the density is higher than desired.

The peripheral filtering layers 20, 50 act as primary filters to prevent the first porous filter parts 12, 42, 102 from becoming prematurely clogged. The peripheral filtering layers 20, 50 may be designed to remove pollutants larger than 5 µm in size, assuming a spherical shape. For this purpose, fibrous material such as non-woven fabric, a woven fabric, and the like, are useable. In the case of non-woven fabric, the fiber diameter is on the order of 3 denier, with a thickness on the order of 0.5 mm, and with a substrate from about 50–100 g/cm³.

The filters 10, 40, 94 may be used in many different environments and on different apparatus, such as faucet-joined systems, installed systems, built-in systems in which the system has been built in advance into a kitchen counter, and portable systems. Even in a faucet-joined system in which weight and size reduction are important, the filters 10, 40, 94 are capable of providing adequate water treatment while allowing adequate flow rates of water.

The inventive filters can be used to filter household tap water by permitting effective filtering with a relatively small size structure, yet which allows flow rates adequate for this environment. At the same time, the inventive filter may effectively remove chlorine, fine pollutants, and turbidity for a relatively long operating period.

The above described first and second filter parts can be used in conjunction with at least a third filter part which enhances water treatment capability.

Performance of the inventive filters 10, 40, 94 will be demonstrated with respect to the following test results, showing performance characteristics of inventive filters and comparative filters.

INVENTIVE FILTER NO. 1

A particulate active carbon, passed through a mesh of 60–100, and a particulate active carbon passed through a mesh of 100, were mixed in a ratio of 2.5:1. A high-molecular porous polymer of 1.5 g/10 min (ASTM D1238, 190° C., 15 kg Load) (Hostalen GUR 2105, product of Ticona GmbH) was added to this mixture in an amount of 15% by weight. The resulting mixture was then heated in a mold at 200° C. for one hour and then cooled, followed by a pressing step to reduce the volume of the mixture. The first filter element that was formed was an active carbon block with a 45 mm outer diameter, 11 mm inner diameter, 92 mm height, and a density of 0.55 g/cm³. A second filter part was formed from a hollow membrane and was disposed internally of the first filter part. A non-woven fabric was wound around an outer peripheral surface of the first filter part, followed by attachment of water-impermeable caps to the top and bottom of the first filter part. The caps were made of polyethylene resin, with the bottom cap being provided with an opening. An evaluation was made of the resultant filter for water treatment with respect to flow rate at initial filtration and the ability to treat residual chlorine and turbidity. These were determined in accordance with the test method of water treatment apparatus for household use (JIS S3201: 1999) or the water treatment apparatus (JWWA S102: 1998).

INVENTIVE EXAMPLE NO. 2

A particulate active carbon, passed through a mesh of 60–100 and a particulate active carbon passed through a mesh of 100 were mixed in a ratio of 2:1. A high-molecular porous polymer of 1.5 g/10 min (ASTM D1238, 190° C., 15 kg Load) (Hostalen GUR 2105, product of Ticona GmbH) was added in an amount of 15% by weight. The mixture was heated in a mold at 200° C. for one hour and then cooled, after which a pressing step was carried out. A first filter part made of an active carbon block was thereby formed with a 45 mm outer diameter, 11 mm inner diameter, and height of 60 mm. After setting, the filter had a density of 0.55 g/cm³. A second filter part was formed from a hollow membrane and was placed internally of the first filter part. A non-woven fabric was wound around an outer peripheral surface of the first filter followed by the attachment of water-impermeable caps to top and bottom portions of the first filter part. The caps were made of polyester resin, with the bottom cap being provided with an opening. Evaluation was made of the resultant filter for water treatment in respect to flow rate at initial filtration and in terms of the ability to treat residual chlorine and turbidity.

INVENTIVE EXAMPLE NO. 3

A filter for use in water treatment was obtained as described with respect to inventive example No. 1, except that a particulate active carbon, capable of passing through a mesh of from 60–100, and a particulate active carbon capable of passing through a mesh of 100, were mixed in a ratio of 5:1. Evaluation was made in the same manner as for inventive example. Nos. 1 and 2.

INVENTIVE EXAMPLE NO. 4

A filter was made in the same manner as for inventive example No. 1 except that a particulate active carbon capable of passing through a mesh of 60–100 and a particulate active carbon capable of passing through a mesh of 100 were mixed in a ratio of 1:2. Evaluation was made as for inventive example Nos. 1–3.

COMPARATIVE EXAMPLE NO. 1

A first filter part was made with a particulate active carbon. A second filter part with a hollow yarn membrane was located downstream of the first filter part. The first filter part had a layer filled with a particulate active carbon capable of passing through a mesh of from 60–100. The hollow yarn membrane was formed from polyethylene and with pores on the order of 0.1µ in diameter. Both the active carbon layer and the hollow yarn membrane were disposed in a substantially equal volume in the filter. The size of the filter was virtually identical to that for inventive example No. 1. Evaluation was made as for inventive example. Nos. 14.

COMPARATIVE EXAMPLE 2

A filter was made in the same manner as described for inventive example No. 1 except that while the first filter part of inventive example No. 1 was used, the second filter part formed from a hollow yarn membrane as described with respect to inventive example No. 1 was not used. Evaluation was made as for inventive example Nos. 1–4.

The results of the above evaluation are set forth in Table 1, below.

TABLE 1

| Evaluation Items Test Conditions | Flow Rate at Initial Treatment [L/min] (Dynamic Water Pressure 1 MPa) | Capability of Removing Residual Chlorine [L] (Treating Flow Rate 2.0 L/min) | Capability of Removing Turbidity [L] (Dynamic Water Pressure 1 MPa) |
|---|---|---|---|
| Inventive Example 1 | 3.3~3.7 | 3400 | 2400 |
| Inventive Example 2 | 3.2~3.6 | 3500 | 2200 |
| Inventive Example 3 | 3.9~4.2 | 1300 | 1800 |
| Inventive Example 4 | 1.1~1.3 | 4700 | 100 |
| Comparative Example 1 | 2.3~2.5 | 2500 | 1500 |
| Comparative Example 2 | 3.8~4.2 | 3400 | 1500 |

In Table 1, the numerical values indicating the capability of removing residual chlorine and turbidity denote the total amounts of unfiltered water which was filtered to remove residual chlorine at a concentration of 80% and to maintain that state. In the case of turbidity, the evaluation was terminated at the time the flow rate fell to 1.0 L/min because of filter clogging. The unfiltered water was 2 parts per million for evaluation of the capability of removing residual chlorine, with the unfiltered water being at 10 degrees for evaluation of the capability of removing turbidity.

Inventive example Nos. 1 and 2 show a sharp rise in the capability of removing residual chlorine in contrast to comparative example No. 1 and further show a higher capability of removing turbidity. Though inferior in the capability of removing residual chlorine, inventive example No. 3 is superior to comparative example No. 1 with respect to the flow rate at initial treatment and the capability of removing turbidity.

Inventive example No. 4 is low in respect to flow rate at initial treatment and capability of removing turbidity but is outstanding in terms of its ability to remove residual chlorine.

With comparative example No. 2, the flow rate at initial treatment was high. Comparative example No. 2 was lacking in its ability to remove turbidity due to omission of a second filter. This indicates that the second filter part made from the hollow yarn membrane in inventive example No. 1 is significantly effective.

Further testing was conducted using three additional inventive examples (5–7) and one additional comparative example (3).

INVENTIVE EXAMPLE NO. 5

A first filter part with a non-woven fabric wound around its outer peripheral surface was made in the same manner as described for inventive example No. 2 with the only exception being that there was no second filter part utilized.

INVENTIVE EXAMPLE NO. 6

A filter part as in inventive example No. 5 was made. However, a first particulate active carbon was used that was capable of passing through a mesh of from 60–100, with a second particulate active carbon used that was capable of passing through a mesh of 100 at a ratio of 5:1.

INVENTIVE EXAMPLE NO. 7

A filter was made in the same manner as with inventive example No. 5 with the exception that first particulate active carbon was used that was capable of passing through a mesh of from 60–100 and a second particulate active carbon was used that was capable of passing through a mesh of 100 with the two mixed in a 1:2 ratio.

COMPARATIVE EXAMPLE 3

A filter was made using a particulate active carbon and a hollow yarn membrane. A layer was filled with particulate active carbon capable of passing through a mesh of 60–100. The hollow yarn membrane was formed from polyethylene and had pores of approximately 0.1 µg in diameter. The active carbon layer and hollow yarn membrane were provided in substantially equal volume in the filter. The size of the filter was approximately that described for inventive example No. 5.

Testing, as summarized for inventive example Nos. 1–4 and comparative example Nos. 1 and 2 was conducted, with the results being set forth in Table 2, below.

TABLE 2

| Evaluation Items Test Conditions | Flow Rate at Initial Treatment [L/min] (Dynamic Water Pressure 1 MPa) | Capability of Removing Residual Chlorine [L] (Treating Flow Rate 2.0 L/min) | Capability of Removing Turbidity [L] (Dynamic Water Pressure 1 MPa) |
|---|---|---|---|
| Inventive Example 5 | 3.6~4.0 | 4000 | 1800 |
| Inventive Example 6 | 4.2~4.5 | 1500 | 900 |
| Inventive Example 7 | 1.1~1.5 | 5300 | 200 |
| Comparative Example 3 | 2.3~2.5 | 2500 | 1500 |

As seen in Table 2, inventive example No. 5 shows a sharp increase in the ability to remove residual chlorine as compared to comparative example No. 3 and maintains the ability to remove turbidity. Inventive example No. 6 permitted a flow rate at the start of filtration that was superior to that for inventive example Nos. 5 and 7, but did not perform as well as inventive example Nos. 5 and 7 in terms of its ability to remove residual chlorine and turbidity. Inventive example No. 7 permitted a low initial flow rate but was effective in removing turbidity and excellent in terms of its ability to remove residual chlorine.

The foregoing disclosure of specific embodiments is intended to be illustrative of the broad concepts comprehended by the invention.

The invention claimed is:

1. A filter for removing contaminants from water, said filter comprising:
   a first porous filter part comprising an active carbon in a high-molecular low-melt index polymeric binder;
   an inlet for directing water to be filtered to the first porous filter part; and
   an outlet for directing water filtered by passage through the first porous filter part to a point of use, wherein the polymeric binder comprises a porous polymer with a melt index of from 1.1–2.3 g/10 min (ASTM D1238, 190° C., 15 kg Load), wherein the active carbon comprises two different particulate active carbons consisting of a) a first particulate active carbon having a larger particle diameter capable of passing through a mesh of 60–100 and b) a second particulate active carbon having a smaller particle diameter capable of passing through a mesh of larger than 100, with the first and second particulate active carbon being mixed in a ratio of 1:4–4:1, wherein the first porous filter part comprises polymeric binder in an amount of 10–25% by weight to active carbon and the first porous filter part has a density of 0.5–0.65 g/cm$^3$.

2. The filter for removing contaminants from water according to claim 1 further comprising a second fibrous filter part comprising a hollow yarn membrane, and the inlet and outlet are arranged so that water to be treated passes from the inlet first through one of the first porous filter part and the second fibrous filter part then through the other of the first porous filter part and the second fibrous filter part and to and through the outlet.

3. The filter for removing contaminants from water according to claim 2 wherein the one of the first porous filter part and second fibrous filter part is the first porous filter part.

4. The filter for removing contaminants from water according to claim 2 wherein the first porous filter part is located externally of the second fibrous filter part and water to be treated passes from the inlet from a location externally of the first porous filter part to and through the first porous filter part and to and through the second fibrous filter part.

5. The filter for removing contaminants from water according to claim 2 wherein the hollow yarn membrane has pores of a size on the order of 0.01–5 µm.

6. The filter for removing contaminants from water according to claim 2 wherein the hollow yarn membrane comprises at least one of polyvinyl alcohol, polyacrylonitrile, polyvinyl chloride, polyethylene, polypropylene, 4-methyl-1-pentene, polyester, polyamide, polysulfone, and cellulose derivatives.

7. The filter for removing contaminants from water according to claim 1 wherein the first porous filter has a peripheral surface through which untreated water passes in moving from the inlet towards the outlet.

8. The filter for removing contaminants from water according to claim 1 further comprising a peripheral filtering layer around the first porous filter part through which water to be filtered is passed in moving toward the first porous filter part.

9. The filter for removing contaminants from water according to claim 8 further comprising water-impermeable first and second caps attached in watertight relationship to the first porous filter part and one of the caps has an opening for discharging water treated by the first porous filter part.

10. The filter for removing contaminants from water according to claim 8 wherein the peripheral filtering layer comprises at least one of a fibrous material, a non-woven fabric, and a woven fabric.

11. The filter for removing contaminants from water according to claim 8 wherein the peripheral filtering layer has a cylindrical shape.

12. The filter for removing contaminants from water according to claim 1 further comprising a second filter part situated so that the first porous filter part and second filter part are located one on top of the other.

13. The filter for removing contaminants from water according to claim 12 wherein the first porous filter part is above the second filter part, the inlet and outlet are arranged so the water to be treated passes from the inlet to the first porous filter part, through the first porous filter part to the second filter part, and through the second filter part to the outlet.

14. The filter for removing contaminants from water according to claim 1 further comprising an adaptor for connecting the filter to a tap water faucet.

15. The filter for removing contaminants from water according to claim 1 further comprising a peripheral filter around the first porous filter part through which water to be filtered is passed in moving towards the first porous filter part.

16. The filter for removing contaminants from water according to claim 15 wherein the outlet is defined by a through hole.

17. The filter for removing contaminants from water according to claim 16 further comprising an adaptor for connecting the filter to a tap water faucet.

18. The filter for removing contaminants from water according to claim 1 wherein the filter comprises an outer peripheral surface through which untreated water passes in moving from the inlet towards the outlet.

19. The filter for removing contaminants from water according to claim 1 wherein the first porous filter part has a cylindrical shape.

20. The filter for removing contaminants from water according to claim 1 wherein the first porous filter part is made by a method comprising the steps of mixing together a) the particulate active carbon and b) the polymeric binder to make a first mixture; placing the first mixture in a mold having a height; vibrating the first mixture so that it has a height in the mold that is 5–15% greater than a desired height for the first porous filter part upon completion thereof; heating the first mixture to fluidize the polymeric binder; pressing the first mixture in the mold to adjust the height of the first mixture in the mold; cooling the first mixture in the mold to complete formation of the first porous filter part; and separating the first porous filter part from the mold.

* * * * *